United States Patent [19]

Cooley, Jr.

[11] Patent Number: 4,688,632

[45] Date of Patent: Aug. 25, 1987

[54] QUICK CONNECT WELLHEAD ADAPTER

[75] Inventor: Claiborn Cooley, Jr., Stephenville, Tex.

[73] Assignee: FMC Corporation, Chicago, Ill.

[21] Appl. No.: 793,393

[22] Filed: Oct. 31, 1985

[51] Int. Cl.$^4$ .................. F16L 55/00; F16L 57/00
[52] U.S. Cl. .................. 166/77.5; 285/12; 285/45; 138/96 R
[58] Field of Search .............. 166/77.5, 75.1, 76, 166/85, 379; 285/12, 39, 177, 354, 176, 45; 138/96 R, 96 T

[56] References Cited

U.S. PATENT DOCUMENTS

| | | | |
|---|---|---|---|
| 2,733,940 | 2/1956 | Millar | 285/39 X |
| 3,087,512 | 4/1963 | Hickman et al. | 285/45 X |
| 4,316,316 | 2/1982 | Kappenhagen | 285/354 X |
| 4,442,907 | 4/1984 | Sexton | 166/85 X |
| 4,573,712 | 3/1986 | Cameron | 166/77.5 X |
| 4,574,882 | 3/1986 | Szarka | 166/75.1 |

*Primary Examiner*—Stephen J. Novosad
*Assistant Examiner*—David J. Bagnell
*Attorney, Agent, or Firm*—L. B. Guernsey; H. M. Stanley

[57] ABSTRACT

A compact well head adapter having a uniform design for a variety of well casing sizes. An annular adapter body includes a lower portion threaded for connection to a well casing, an upper portion threaded for connection to a fluid conductor, and a bore for the transfer of fluid between the casing and the fluid conductor. A removable annular shield is removably connected to the upper portion of the adapter body to protect the upper threaded portion from damage in handling. The lower threaded portion can be varied in size to fit different size well casings and the upper portion remains the same size for connection to the fluid conductor and to the annular shield. The adapter is supported by a swivel to facilitate rotation of the adapter as the adapter is threaded onto the well casing.

6 Claims, 4 Drawing Figures

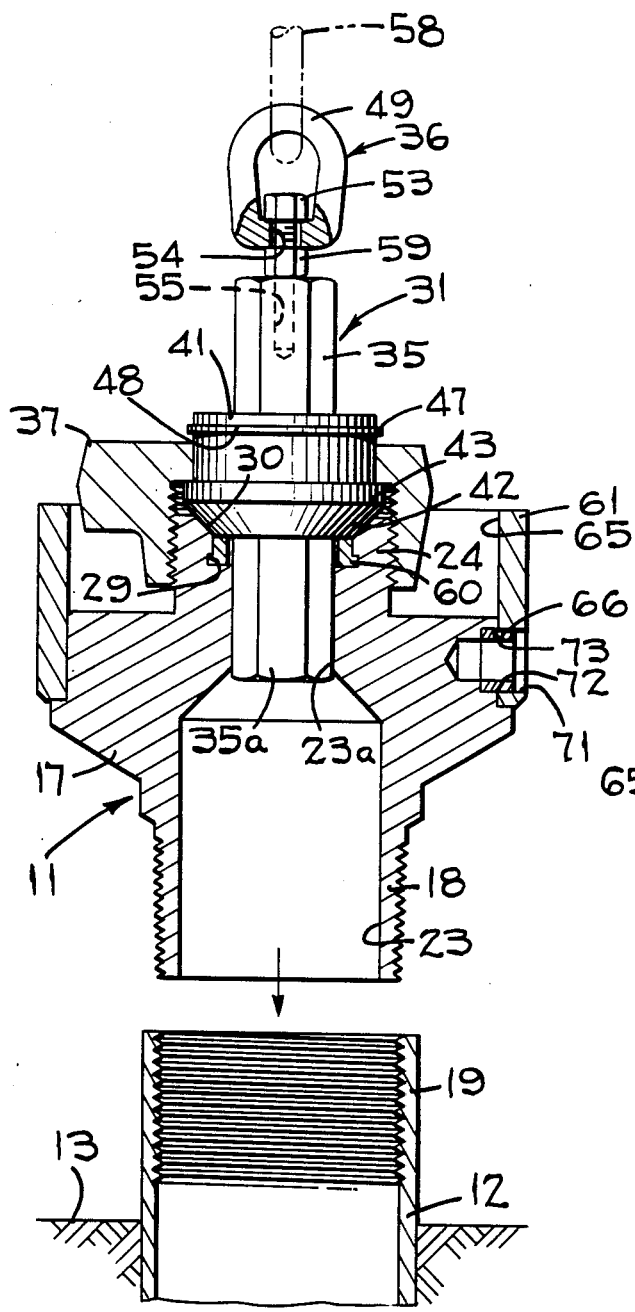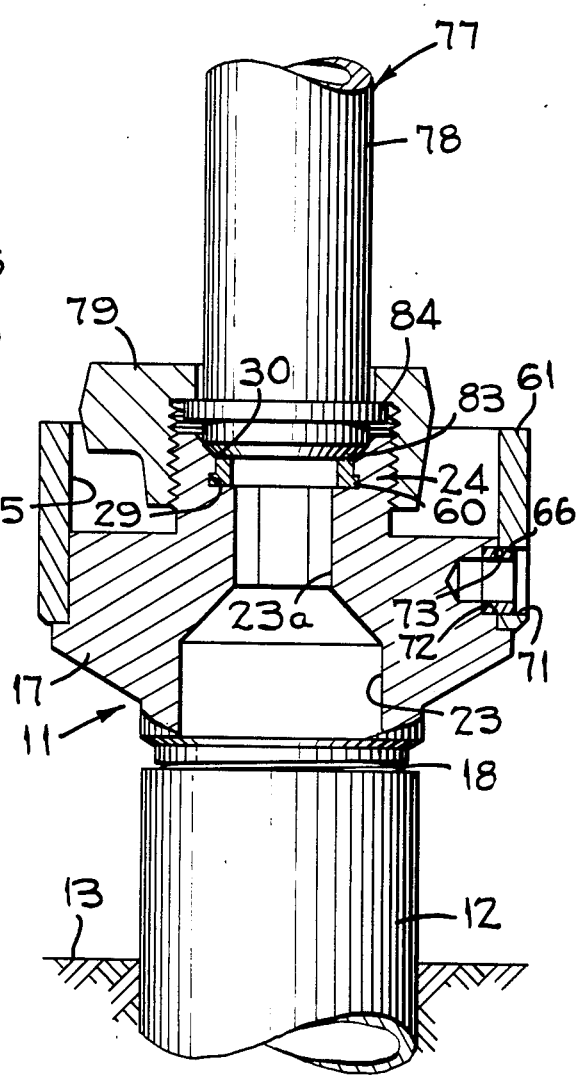

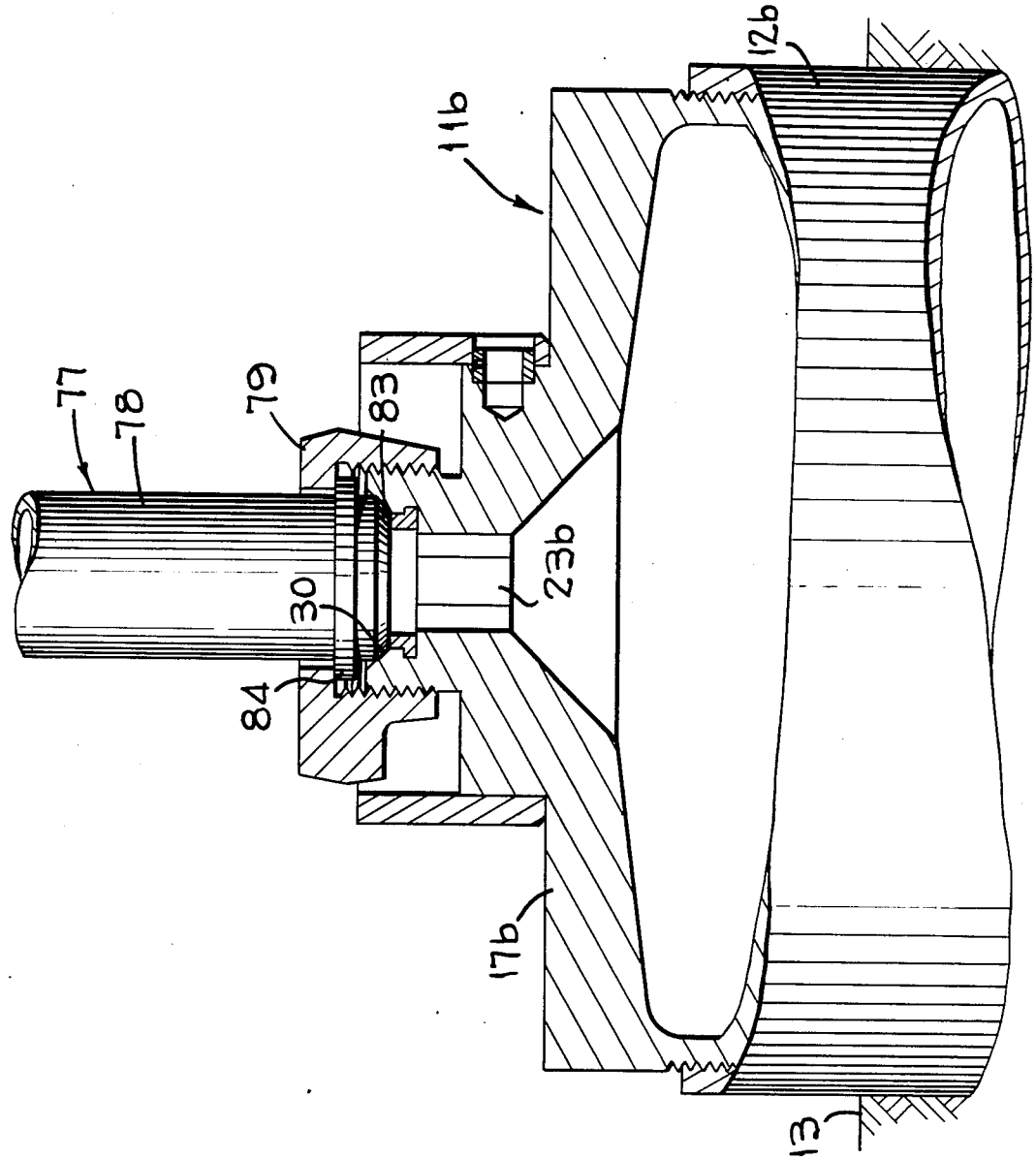

QUICK CONNECT WELLHEAD ADAPTER

BACKGROUND OF THE INVENTION

This invention relates to wellhead adapters for controlling fluid flow and fluid pressure in a well, and more particularly, to a compact wellhead adapter for quick connection to well casings of various sizes.

Wellhead adapters are used in the petroleum industry to connect subterranean well casings to fluid conductors which supply a combination of mud and chemicals into the well casing to prevent high pressure wells from flowing out of control. The mud mixture can be forced into the well casings to plug the casings and relieve pressure on the wellhead adapters at the upper end of the casing. The wellhead adapters are threaded at the lower end and fit into the well casings which are threaded at the upper end. Each wellhead adapter must be carefully aligned with the upper end of the corresponding well casing and the wellhead adapter rotated to connect the wellhead adapter to the casing. Since individual wellhead adapters may have considerable weight the lifting, aligning and rotating the wellhead adapter is not an easy task.

SUMMARY OF THE INVENTION

The present invention provides a compact wellhead adapter that can be quickly and easily lifted into position and connected to the upper end of a well casing. The wellhead adapter includes an annular body having a lower threaded portion for connection to the threaded upper portion of a well casing with an axial bore extending from the lower end of the annular body to the upper end of the body. A few different diameters of lower ends of the wellhead adapter can be used to fit the standand diameters of well casings commonly used in the industry. The upper portion of the wellhead adapter is threaded for connection to a single standard fluid conductor such as a mud line. A plug assembly includes a plug to fit the axial bore in the adapter body and a union nut which mates with the threaded upper portion of the adapter body to retain the plug and the bore when the fluid conductor is not connected to the adapter body. A hollow annular sleeve placed around the upper portion of the adapter body protects the threaded upper portion from damage due to handling or due to tipping of the wellhead adapter which can smash the threads against a floor or against other objects. A swivel connected to the plug can be connected to a lifting device which moves the lower threaded portion of the adapter body into alignment with the threaded upper end of the well casing. A wrench can then be connected to the plug and used to rotate the plug and adapter body to thread the adapter body to the well casing. The union nut and plug can then be removed from the adapter body, and the fluid conductor can be threaded onto the upper portion of the adapter body.

BRIEF DESCRIPTION OF THE DRAWINGS

FIG. 1 a cross sectional view of the wellhead adapter of the present invention with a plug assembly connected to the upper portion of the adapter body.

FIG. 2 is a cross sectional view of a wellhead adapter of the present invention connected between a fluid conductor and a well casing.

FIGS. 3 and 4 illustrate cross sectional views of wellhead adapters for use with larger well casings than the one shown in FIG. 1, but connected to the same fluid conductor as that shown in FIG. 2.

DESCRIPTION OF THE PREFERRED EMBODIMENT

Referring to FIGS. 1, 2 there is illustrated a wellhead adapter 11 for connection to a well casing 12 which extends from the earth's surface 13 into a subsurface well producing formation. The wellhead adapter includes an annular body 17 having a lower threaded portion 18 for connection to a threaded upper end 19 of the well casing 12. An axial bore 23 extends between the lower threaded portion 18 and an upper threaded portion 24 with an upper portion 23a of the axial bore having a hexagonal shape. Immediately above the hexagonal bore 23a is an annular groove 29 and an outward sloping surface 30.

A plug assembly 31 (FIG. 1) includes a hexagonal plug 35, a swivel 36 and a plug nut 37 for connecting the plug assembly 31 to the body 17. A lower portion 35a of the plug 35 fits into the hexagonal bore 23a of the body 17 (FIG. 1) so the plug 35 and body 17 rotate together when the wellhead adapter is threaded onto the well casing 12. An enlarged central portion 41 of the plug 35 includes a sloping or radial portion 42 which mates with the sloping surface 30 of the body 17. The plug nut 37 presses against a flange 43 to secure the plug 35 in the bore 23a. A snap ring 47 fits in a groove 48 to retain the nut 37 about the plug 35 when the plug is removed from the body 17.

The swivel 36 (FIG. 1) includes a ring 49 having a capscrew 53 extending through a hole 54 in the ring and extending into a threaded bore 55 in the upper portion of the plug 35. A lock nut 59 is tightened against the plug 35 with a capscrew adjusted so the ring 49 is free to swivel about the capscrew. The wellhead adapter 11 and the connector plug assembly 31 can be lifted by a lifting device such as a cable 58 and lowered into position in the well casing 12 (FIG. 1) with the threaded portion 18 of the adapter body contacting the threaded portion 19 of the well casing. A wrench or other instrument connected to the upper portion of the plug 35 can be used to rotate the wellhead adapter and connect the wellhead adapter to the casing 12. An annual seal 60 prevents fluid leakage at the junction of the plug 35 and the adapter body 17.

An annular shield or sleeve 61 (FIG. 1) having an axial passage 65 is secured around the upper portion of the wellhead adapter body 17 to protect the upper threaded portion 24 from damage due to handling. The sleeve 61 is secured to a central portion of the body 17 by a plurality of retainers 66 (only one shown) each mounted in a hole 71 in the sleeve 61 and extending into a bore 72 in the body 17. As seen in the Figures, shield or sleeve 61 at its lower end abuts an axially upwardly facing shoulder of the body central portion. The retainer 66 is pressed into the position shown and can be removed by using a hook (not shown) which is inserted through a hole 73 in the retainer. The sleeve 61 extends above the threaded portion 24 so the wellhead adapter can be inverted for storage with the upper end of the sleeve 61 resting on a floor of a storage area. The nut 37 (FIG. 1) and the plug assembly 31 can be removed from and connected to the body 17 with the sleeve 61 connected in the position shown in FIG. 1.

With the wellhead adapter 11 securely on the upper end of the well casing 12 (FIG. 2) and with the plug assembly 31 removed, a hose assembly 77 (FIG. 2) can be connected to the upper end of the wellhead adapter. The hose assembly includes a fluid conductor or hose 78 and the hose nut 79. The lower end of the hose 78 includes a sloping or radial portion 83 which mates with the upper sloping surface 30 of the body 17. The hose nut 79 presses against a radial outward flange 84 on the lower portion of the hose 78 to secure the hose against the body 17. The seal 60 provides a fluid-tight seal between the hose 78 and the body 17.

Other embodiments of the wellhead adapter of the present invention require a modification of only the lower portion of the body 17 of FIGS. 1 and 2 to adapt the unit to fit other sizes of well casings. For example, if the wellhead adapter 11 of FIGS. 1 and 2 is designed for connection to a standard four and one-half inch diameter well casing 12 the lower portion can be enlarged as shown in FIG. 3 for connection to a seven inch diameter well casing 12a. The upper portion of the well-head adapter 11a can be connected to the same hose assembly 77 and to the same sleeve 61 shown in FIGS. 1 and 2. Also the same plug assembly 31 can be mounted in the bore 23a and used to insert the wellhead adapter 11a (FIG. 3) into the well casing 12a when the hose assembly is removed from the wellhead adapter.

The lower portion of the wellhead adapter can be further enlarged (FIG. 4) for connection to an eighteen and five-eighths inch diameter well casing 12b. The upper portion of the wellhead adapter 11b can be connected to the same hose assembly 77, the same sleeve 61 and the same plug assembly 31 as shown in FIGS. 1 and 2.

The use of the same plug assembly 31, the same sleeve 61 and the same hose assembly 77 reduces the number of different parts required and reduces the cost of manufacturing the wellhead adapter and its associated parts.

Although the best mode contemplated for carrying out the present invention has been herein shown and described, it will be apparent that modification and variation may be made without departing from what is regarded to be the subject matter of the invention.

What is claimed is:

1. In a wellhead adapter for connection between a wellhead casing and a fluid conductor wherein the adapter has a body having an annular threaded lower portion for connection to the wellhead casing, an annular externally threaded upper portion for selective connection to a fluid conductor securing nut or a plug securing nut, and a central bore therethrough between said threaded portions for selectively receiving a bore-blocking plug or a fluid conductor in association therewith, the improvement therein comprising:

said body including a central portion extending radially outwardly of said threaded upper portion and including an outer peripheral surface, said body central portion terminating along said body axially inwardly of said threaded upper portion thereby to provide fully radially outward exposure of said threaded upper portion with respect to said body, a protective annular shield having an axial length at least as great as the axial length of said threaded upper portion and, said central portion peripheral surface having means cooperatively associated therewith for detachably mounting said shield thereon so as to dispose said shield in surrounding protective relation to said upper threaded portion along the axial length thereof when mounted thereon and permitting detachment therefrom for exposed radial access to said upper threaded portion or to one of said securing nuts threaded thereon.

2. The improved adapter of claim 1 wherein said shield when mounted on said body extends axially outwardly beyond said upper threaded portion.

3. The improved adapter of claim 1 wherein an eye-bolt is swivelly attached to said bore-blocking plug.

4. The improved adapter of claim 1 wherein said lower threaded portion is of lesser diameter that said central body portion.

5. The improved adapter of claim 1 wherein said lower threaded portion is of greater diameter that said central body portion.

6. The improved adapter of claim 1 wherein said central portion peripheral surface includes an axially facing shoulder for receiving said shield thereagainst when mounted on said body.

* * * * *